United States Patent [19]
Liebetreu et al.

[11] Patent Number: 5,949,832
[45] Date of Patent: Sep. 7, 1999

[54] DIGITAL RECEIVER WITH TUNABLE ANALOG FILTER AND METHOD THEREFOR

[75] Inventors: John Michael Liebetreu, Scottsdale; Eric Martin Brombaugh, Mesa, both of Ariz.; Wyn T. Palmer, North Andover, Mass.

[73] Assignee: SiCom, Inc., Scottsdale, Ariz.

[21] Appl. No.: 08/820,084

[22] Filed: Mar. 19, 1997

Related U.S. Application Data

[63] Continuation-in-part of application No. 08/621,690, Mar. 26, 1996, abandoned.

[51] Int. Cl.⁶ .............................. H04L 27/06; H04L 27/08
[52] U.S. Cl. ........................................... 375/344; 455/266
[58] Field of Search ............................... 375/47, 81, 285, 375/344; 455/266, 340, 324

[56] References Cited

U.S. PATENT DOCUMENTS

| | | | |
|---|---|---|---|
| 4,045,740 | 8/1977 | Baker | 325/427 |
| 4,691,176 | 9/1987 | Hsiung et al. | 331/2 |
| 4,856,027 | 8/1989 | Nakamura et al. | 375/81 |
| 5,012,490 | 4/1991 | Myer | 375/285 |
| 5,048,058 | 9/1991 | Kaleh | 375/47 |
| 5,058,138 | 10/1991 | Figura et al. | 375/344 |
| 5,155,466 | 10/1992 | Go | 375/344 |
| 5,155,862 | 10/1992 | Hansen | 455/266 |
| 5,249,202 | 9/1993 | Hillum et al. | 375/344 |
| 5,287,556 | 2/1994 | Cahill | 455/266 |
| 5,303,413 | 4/1994 | Braegas | 455/340 |
| 5,339,455 | 8/1994 | Vogt et al. | 455/266 |
| 5,424,881 | 6/1995 | Behrens et al. | 360/40 |
| 5,438,692 | 8/1995 | Mohindra | 455/324 |
| 5,465,410 | 11/1995 | Hiben et al. | 455/266 |
| 5,511,235 | 4/1996 | Duong et al. | 455/266 |
| 5,564,093 | 10/1996 | Matsumoto | 455/266 |

OTHER PUBLICATIONS

Stanford Telecom ASIC & Custom Products Catalog, Eighth Edition,–cover sheet and pp. 55–67.

*Primary Examiner*—Stephen Chin
*Assistant Examiner*—Joseph Roundtree
*Attorney, Agent, or Firm*—Meschkow & Gresham,P.L.C.; Lowell W. Gresham; Jordan M. Meschkow

[57] ABSTRACT

A digital data receiver includes a tunable analog matched filter circuit having a variable bandwidth responsive to the bit error rate (BER) of the decoded data. The bandwidth of the analog filtering circuit is controlled by a tuning control signal that includes a coarse tuning signal combined with a fine tuning signal. The coarse tuning signal is generated by a frequency-to-current converter and the fine tuning signal is generated by a current-scaling digital-to-analog converter (DAC). The DAC input signal is produced by a DAC control circuit that includes a BER comparator and a DAC control state machine. The BER comparator determines whether the BER has improved or degraded in response to a previous tuning command. To optimize the BER in the decoded data signal, the state machine increments or decrements the value of the fine tuning signal, which in turn alters the filter bandwidth.

21 Claims, 5 Drawing Sheets

DIGITAL RECEIVER WITH TUNABLE ANALOG FILTER AND METHOD THEREFOR

RELATED APPLICATION

The present patent application is a continuation-in-part of "Digital Receiver With Tunable Analog Filter And Method Therefor" by John M. Liebetreu, Eric M. Brombaugh, and Wyn T. Palmer, Ser. No. 08/621,690, filed Mar. 26, 1996 now abandoned.

FIELD OF THE INVENTION

The present invention relates generally to data communication systems. More specifically, the present invention relates to digital receivers having analog filtering circuits.

BACKGROUND OF THE INVENTION

A digital data receiver often includes an analog filtering section that conditions an input signal after it has been down-converted to a baseband or intermediate frequency. The analog filtering section removes noise and unwanted frequency components from the down-converted signal to prepare the signal for digitizing. In a conventional digital receiver, the filtering circuit has a fixed bandwidth that is set to accommodate the anticipated baud rate of the incoming signal and to optimize the signal quality and the quality of the decoded data.

Signal quality is adversely affected by both intersymbol interference (ISI) and adjacent channel interference (ACI). Analog filtering circuits may be implemented to reduce ISI, ACI, or other electronic noise associated with digital signal transmissions. For example, ISI is reduced when the filter bandwidth is widened and ACI is reduced when the bandwidth is narrowed. Unfortunately, conventional fixed bandwidth filters inherently increase the amount of ISI when they are tuned to reduce ACI, and vice versa. As such, conventional analog filtering circuits in digital receivers are usually tuned to a less-than-optimum bandwidth with respect to ISI and ACI, which are often a priori unknown.

It may be desirable to receive digital data conveyed over a broad range of baud rates. However, conventional digital data receivers that utilize filtering circuits with fixed bandwidths may only have a narrow operating range, e.g., a percentage of the minimum operating baud rate. Outside of this narrow range, such conventional filters may not be tuned to sufficiently reduce ISI and/or ACI. Thus, fixed bandwidth filters may be undesirable for applications that operate over a baud rate range of more than several MHz.

The bandwidth accuracy of conventional tunable analog filters is only about 10%. Although such accuracy may be sufficient to enable a digital receiver to gain symbol synchronization, the bandwidth inaccuracy may produce an unacceptable bit error rate (BER) resulting from excessive ISI or ACI. To minimize the BER in some applications, it may be necessary to maintain bandwidth accuracy to within 5% or less. Unfortunately, conventional fixed bandwidth filters are not responsive to fluctuations in BER, ISI, or ACI.

In addition, the bandwidth of analog filters drifts in response to changes in operating temperatures, variations in assembly techniques, the age of the electronic components, and component tolerances. The bandwidth stability of analog filter circuits may be improved by utilizing expensive components with tight tolerances or by maintaining strict manufacturing guidelines. Moreover, such filters often must be individually aligned to meet the desired receiver specifications. Thus, procurement, manufacturing, and maintenance costs are excessive when compared to less precise, easily manufacturable, non-aligned filtering circuits.

SUMMARY OF THE INVENTION

Accordingly, it is an advantage of the present invention that an improved digital data receiver is provided.

Another advantage of the present invention is that a digital data receiver is provided that includes a tunable analog filtering circuit.

A further advantage is that the bandwidth of the tunable analog filtering circuit is responsive to a signal quality indicator obtained from the decoded data.

Another advantage is that the digital data receiver may be realized with inexpensive components having broad electronic tolerances.

Another advantage is that the present invention provides a digital data receiver capable of receiving input signals having a wide range of baud rates.

The above and other advantages of the present invention are carried out in one form by a digital data receiver having an analog filtering circuit, means for obtaining a signal quality indicator, and means for generating a tuning control signal. The filtering circuit has a variable bandwidth that is responsive to the tuning control signal. The tuning control signal varies in response to changes in the signal quality indicator.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENT

Figure 1:
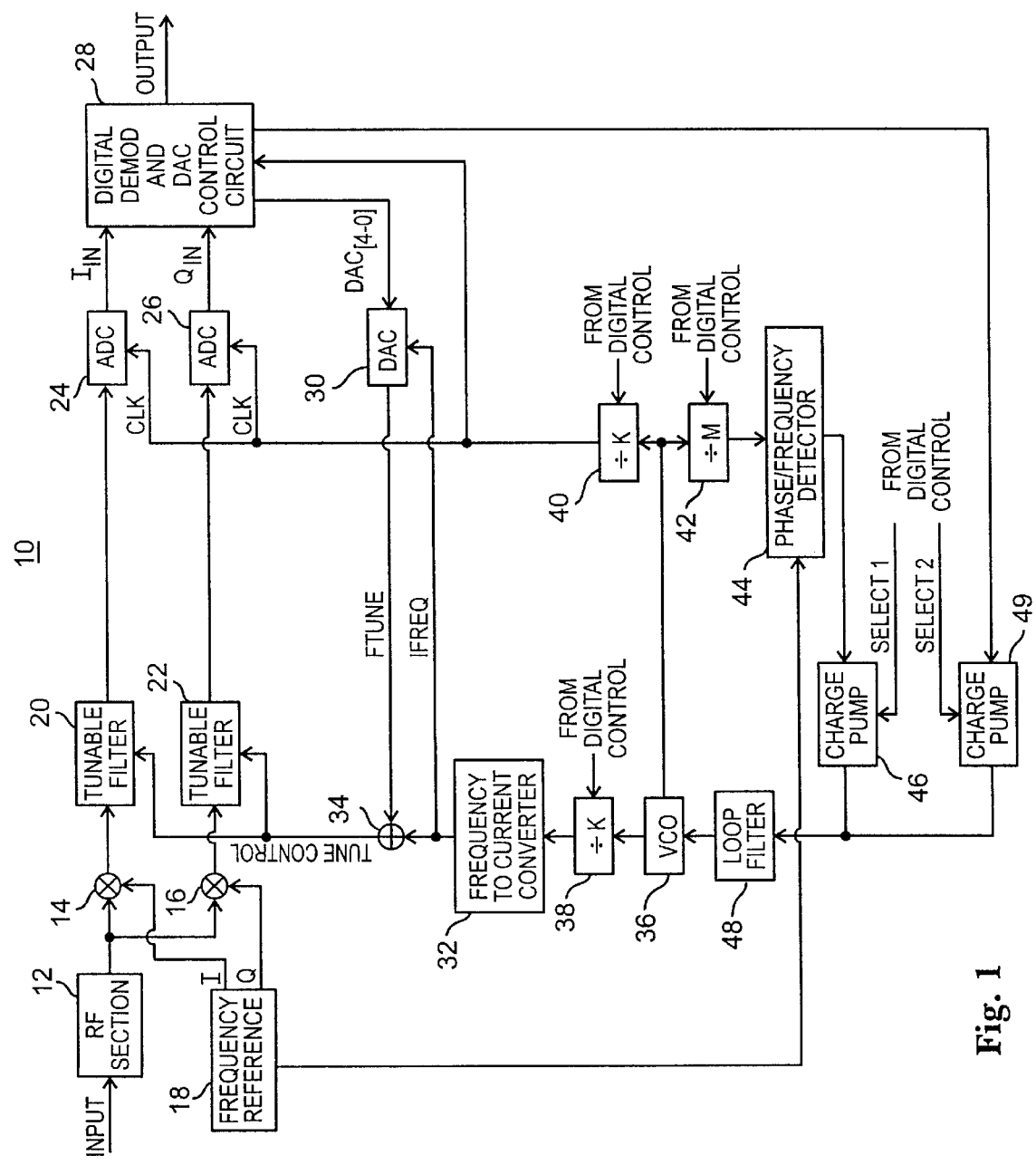
FIG. 1 is a schematic representation of a data communications receiver.

FIG. 1 is a schematic representation of a data communications receiver 10 configured in accordance with the preferred embodiment of the present invention. Receiver 10 receives and processes an analog carrier signal configured to convey digital data at a predetermined baud rate. The analog signal may, for example, be encoded via QPSK modulation. However, receiver 10 may be alternatively configured to receive and process signals generated by other digital modulation schemes.

The modulated analog input signal enters an RF section 12 shortly after being received. RF section 12 may include filtering circuits, attenuators, buffers, and/or other conventional RF components configured to condition the analog carrier signal. The output of RF section 12 couples to a first mixer 14 and a second mixer 16.

A frequency reference 18 generates I and Q reference signals at a baseband or intermediate frequency. The I and Q reference signals serve as inputs to first mixer 14 and second mixer 16, respectively. Mixers 14 and 16 down-convert the analog input signal into respective I and Q components. The output of first mixer 14 couples to a first matched filter 20 and the output of second mixer 16 couples to a second matched filter 22. First and second filters 20 and 22 form an analog filtering circuit.

In the preferred embodiment, first and second filters 20 and 22 are matched tunable Nyquist filters. Of course, those skilled in the art will recognize that the present invention may operate equivalently utilizing alternative filter configurations. The bandwidth of filters 20 and 22 is adjusted in response to a current tuning control signal (labeled TUNECONTROL). The TUNECONTROL signal is described in more detail below. Receiver 10 regulates the bandwidth of the analog filtering circuit to reduce unwanted noise in the encoded data signal. Such noise may include intersymbol interference (ISI), adjacent channel interference (ACI), and/or additive Gaussian noise (AWGN).

The output of first filter 20 is fed to a first analog-to-digital converter (ADC) 24. Similarly, second filter 22 is coupled to a second ADC 26. ADCs 24 and 26 are configured to sample the I and Q components at approximately the symbol clock rate or at an integral multiple thereof. The outputs of first and second ADCs 24 and 26 (respectively labeled $I_{IN}$ and $Q_{IN}$ in FIGS. 1–2) are coupled to a digital circuit 28.

Depending upon the specific application, digital circuit 28 may be configured as one or more application specific integrated circuit (ASIC) chips. Digital circuit 28 includes a demodulation circuit (described below) that extracts the digitally encoded data from $I_{IN}$ and $Q_{IN}$. Digital circuit 28 also generates a digital word (labeled $DAC_{[4-0]}$ in FIGS. 1–2) that serves as an input to a digital-to-analog converter (DAC) 30. In the preferred embodiment, $DAC_{[4-0]}$ is a 5-bit word associated with a bandwidth update request. Of course, $DAC_{[4-0]}$ can have more or less bits and DAC 30 can have higher or lower bit resolution depending upon the specific application.

DAC 30 obtains $DAC_{[4-0]}$ from digital circuit 28 and converts it into an analog equivalent. DAC 30 also receives a coarse control signal (labeled IFREQ) from a frequency-to-current converter 32. DAC 30 performs an arithmetic operation upon the analog equivalent and the coarse control signal to generate a fine control signal (labeled FTUNE).

According to the preferred embodiment, DAC 30 utilizes IFREQ as a scaling factor for the analog equivalent. In particular, DAC 30 is configured to perform the following operation:

$$FTUNE=[(-1)^{DAC_4}][IFREQ][DAC_{3-0}/15].$$

$DAC_4$, which represents the most significant bit of $DAC_{[4-0]}$, determines the sign of FTUNE. $DAC_{3-0}$ represents the four least significant bits of $DAC_{[4-0]}$. Those skilled in the art will recognize that the above relationship can be modified according to the bit resolution of DAC 30. Receiver 10 combines IFREQ and FTUNE in a summer 34. The output of summer 34 serves as the current tuning control signal (TUNECONTROL) for filters 20 and 22.

As described above, frequency-to-current converter 32 generates the IFREQ signal. Frequency-to-current converter 32 may be realized in any number of ways known to those skilled in the art. Converter 32 may include buffers, mixers, filters, and/or summers (not shown) that are configured to produce a stable current proportional to the frequency of a voltage controlled oscillator (VCO) 36.

In accordance with the preferred embodiment, the current of the IFREQ signal is responsive to the anticipated baud rate of the input signal. As such, frequency-to-current converter 32 is coupled to VCO 36 through a frequency divider 38. The output of VCO 36 is regulated by a phase locked loop to enable receiver 10 to acquire and maintain symbol synchronization with the input signal. Frequency divider 38 includes a programmable divisor (K) that serves to extend the range of VCO 36. The extended range of VCO 36 is desirable when receiver 10 receives input signals having a broad range of baud rates. In the preferred embodiment, K ranges between one and four, and the value of K is controlled by digital circuit 28.

The output of VCO 36 is also coupled to a frequency divider 40, which functions similar to frequency divider 38. The output of frequency divider 40 provides a symbol clock signal (labeled CLK) that is utilized at least by ADC 24, ADC 26, and digital circuit 28. A phase locked loop circuit functions to control the frequency of the signal generated by VCO 36. The feedback loop includes a frequency divider 42, which includes a programmable divisor (M). Frequency divider 42 is controlled by digital circuit 28, and the value of M is selected to enable the CLK signal to initially approximate the anticipated input baud rate. Thus, frequency divider 42 facilitates signal acquisition when receiver 10 is initially powered up.

The output of frequency divider 42 is coupled to a phase/frequency detector (PFD) 44. PFD 44 is also coupled to frequency reference 18. Frequency reference 18 can incorporate two separate frequency oscillators for the generation of different reference frequencies. For example, one oscillator may be utilized to generate the I and Q reference signals (described above) at a first frequency. In addition, frequency reference 18 may include a second oscillator, frequency dividers, and other components (not shown) configured such that a signal having a reasonably stable second frequency is input at PFD 44. According to the preferred embodiment, PFD 44 receives a signal having a frequency of about 20 kHz. Utilizing conventional methodologies, PFD 44 compares the phase of the signal generated by VCO 36 to the phase of a signal generated by frequency reference 18. The output of PFD 44 is coupled to a first charge pump 46.

First charge pump 46 produces a control signal for VCO 36. The output of first charge pump 46 is filtered through a loop filter 48 before reaching VCO 36. The control signal from charge pump 46 is fed into VCO 36 to complete the phase locked loop. A second charge pump 49 receives an input from digital circuit 28. As with first charge pump 46, the output of second charge pump 49 is coupled to loop filter 48. The input from digital circuit 28 forms an alternate control path for the phase locked loop.

Control signals from digital circuit 28 (labeled SELECT1 and SELECT2) select whether first charge pump 46 or second charge pump 49 is currently active. In the preferred embodiment, the SELECT signals are responsive to frequency acquistion and symbol synchronization processes. Thus, although the output of PFD 44 may be adequate for purposes of initial synchronization and tracking, digital circuit 28 may provide higher phase stability after synchronization. In addition, separate charge pumps may be desirable to provide the appropriate value of loop bandwidth for each loop and to compensate for differences in the gain of each loop.

Figure 2:
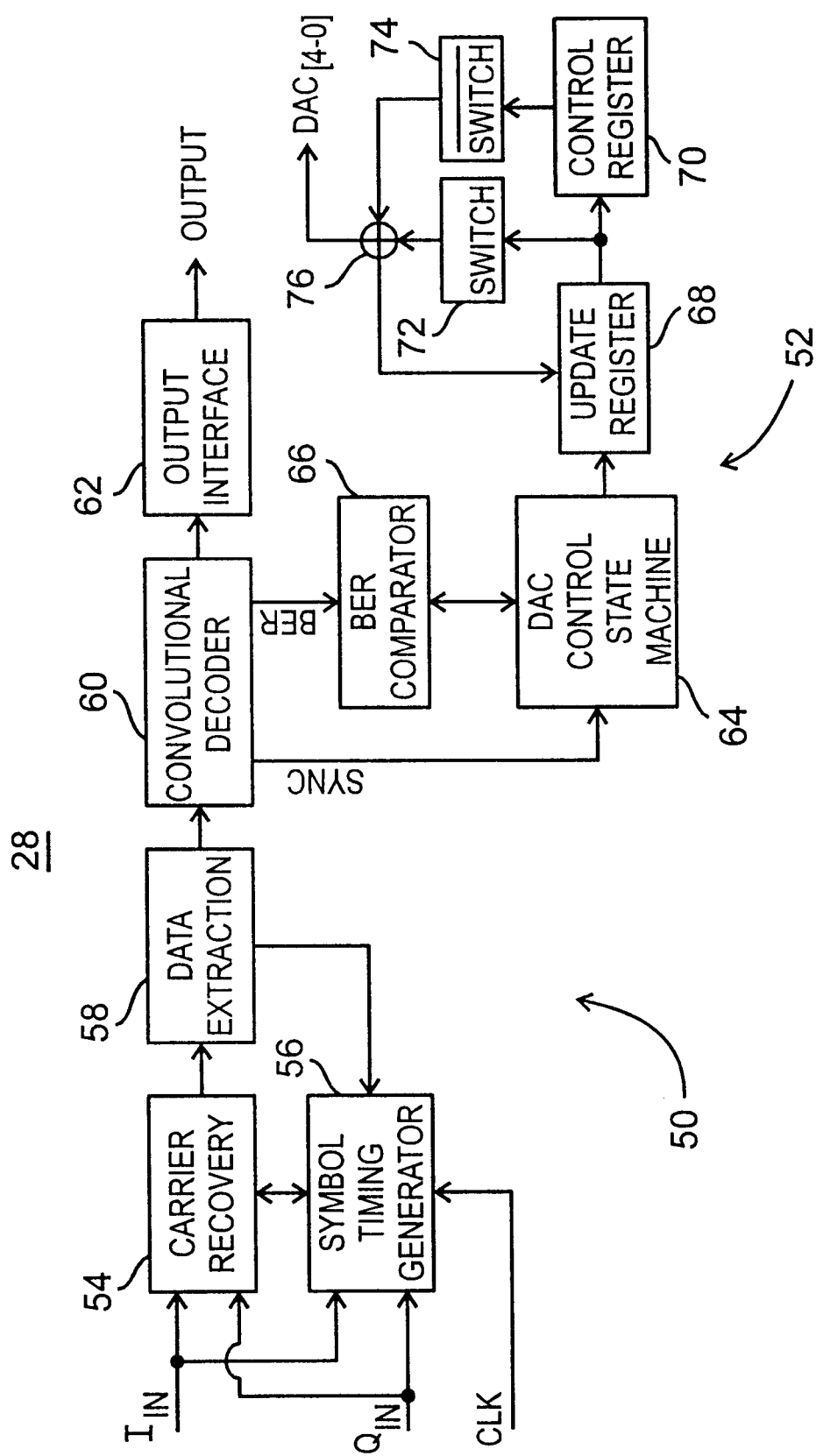
FIG. 2 is a schematic representation of a digital circuit utilized by the receiver.

FIG. 2 is a schematic representation of digital circuit 28. For the sake of clarity, conventional components are not shown or described herein. For example, digital circuit 28 may include a microprocessor, a digital signal processor (DSP), a memory element, or additional control circuits (not shown). As described above, digital circuit 28 includes a digital demodulation circuit 50 and a DAC control circuit 52. Demodulation circuit 50 extracts the digitally encoded data from $I_{IN}$ and $Q_{IN}$, and DAC control circuit 52 generates $DAC_{[4-0]}$ (the digital input word)

Demodulation circuit 50 utilizes conventional demodulation and decoding techniques known to those skilled in the art. $I_{IN}$ and $Q_{IN}$ serve as inputs to a carrier recovery circuit 54 and a symbol timing generator 56. Symbol timing generator 56 also receives the CLK signal generated by VCO 36 (see FIG. 1). Symbol timing generator 56 provides carrier recovery circuit 54 with a symbol synchronization signal, and carrier recovery circuit 54 may provide symbol timing generator 56 with a feedback control signal. A data extraction circuit 58 is coupled to the output of carrier recovery circuit 54. Data extraction circuit 58 extracts the encoded digital data from the carrier signal. Data extraction circuit 58 may also provide symbol timing generator 56 with a feedback control signal.

The output of data extraction circuit 58 is coupled to a convolutional decoder 60. Convolutional decoders are well known to those skilled in the art and will not be described in detail herein. An output interface 62 receives the decoded data from convolutional decoder 60 and generates a corresponding digital output. The digital output is then routed according to system specifications.

Convolutional decoder 60 is preferably configured to produce a synchronization bit (labeled SYNC) and a bit error rate signal (labeled BER). The bit error rate may also be referred to as channel symbol error rate. The SYNC bit indicates when convolutional decoder 60 has acquired node synchronization with the coded input signal. The BER signal represents an estimation of the present BER of the decoded data. Convolutional decoder 60 may utilize known techniques to obtain the BER estimation. Although the preferred embodiment utilizes BERs to quantify the received signal quality, the present invention may monitor any suitable signal quality indicator to achieve equivalent results. The BER is a desirable signal quality indicator because it is responsive to ISI, ACI, and AWGN (described above). The SYNC bit and the BER signal are utilized as inputs to DAC control circuit 52.

DAC control circuit 52 generates $DAC_{[4-0]}$, which is the digital word that serves as an input to DAC 30 (see FIG. 1). DAC control circuit 52 preferably operates at a slower speed than the symbol clock rate generated by VCO 36 (see FIG. 1). For example, in the preferred embodiment, DAC control circuit 52 is clocked once every $2^{19}$ symbols. Although not shown in FIG. 2, digital circuit 28 may include a timeout circuit that generates the slower clock signal for the components of DAC control circuit 52.

DAC control circuit 52 is configured around a DAC control state machine 64. State machine 64 may be realized by discrete logic circuit components or by software instructions stored in a microprocessor or a DSP (not shown). Briefly, state machine 64 determines, in response to BER estimations, whether to widen or narrow the bandwidth of filters 20 and 22 (see FIG. 1).

State machine 64 is coupled to a BER comparator 66. BER comparator 66 obtains BER estimations from convolutional decoder 60 and determines the difference between a past BER estimation and a current BER estimation. Thus, BER comparator 66 may include memory elements, subtractor circuits, and other components (not shown). The operation of state machine 64 and BER comparator 66 is described in detail below in connection with FIGS. 4–5.

State machine 64 is coupled to an update register 68, which is configured to temporarily store a digital word. The digital word stored in update register 68 is incremented or decremented in response to instructions from state machine 64. Update register 68 is coupled to a non-volatile control register 70, which periodically stores the current digital word as historical tuning data.

A first logic switch 72 is connected between the output of update register 68 and a summer 76, and a second logic switch 74 is connected between the output of control register 70 and summer 76. The historical tuning data stored in control register 70 may be utilized by receiver 10 during a subsequent power-up procedure. When receiver 10 is powered up, first switch 72 is open and second switch 74 is closed. The contents of control register 70, i.e., the historical tuning data, are loaded into update register 68 and serve as the $DAC_{[4-0]}$ input to DAC 30 (see FIG. 1). Thus, control register 70 provides an initial input for DAC 30 such that receiver 10 can quickly acquire symbol synchronization with the input signal.

After receiver 10 obtains symbol synchronization, first switch 72 closes and second switch 74 opens. This configuration enables state machine 64 to contribute to the TUNECONTROL signal (see FIG. 1). DAC control circuit 52 is preferably configured to tune the bandwidth of filters 20 and 22 with an accuracy of better than 5%. In contrast, without digital control the bandwidth accuracy is no better than 10%.

Figure 3:
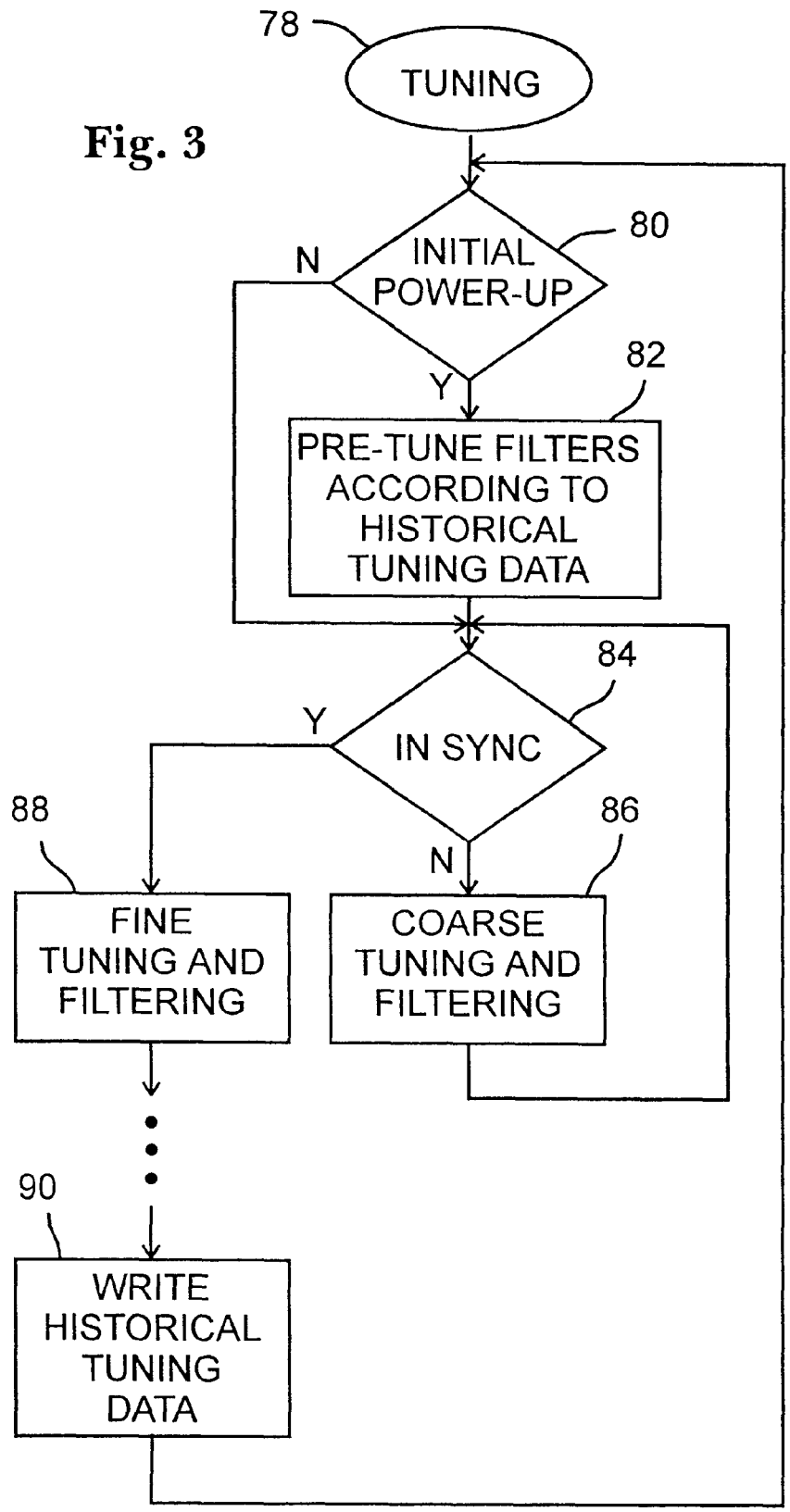
FIG. 3 is a flow diagram of a tuning process performed by the receiver.

With reference to FIG. 3, a tuning process 78 performed by receiver 10 is illustrated as a flow diagram. Process 78 is performed to adjust the bandwidth of matched filters 20 and 22 (see FIG. 1). Process 78 begins with a query task 80, which determines whether receiver 10 is in an initial power-up state. If not, i.e., if receiver 10 has been operating for some time, then a query task 84 is prompted. If query task 80 determines that receiver 10 is in an initial power-up state, then a task 82 is performed. Task 82 pre-tunes filters 20 and 22 according to historical tuning data. Task 82 may also set the values of K and M associated with frequency dividers 38, 40, and 42. As described above, digital circuit 28 retrieves a stored value for $DAC_{[4-0]}$ and the TUNECONTROL signal is generated accordingly.

After task 82, query task 84 tests whether receiver 10 has obtained symbol and node synchronization with the input signal. Receiver 10 synchronizes symbol timing generator 56 to the analog input signal after task 82 is performed. If receiver 10 is not synchronized, then a task 86 causes the bandwidth of filters 20 and 22 to be tuned in a coarse manner.

Coarse tuning may be achieved when frequency-to-current converter 32 (described above) controls the IFREQ signal in response to symbol and node synchronization. In addition, task 86 may configure switches 72 and 74 (see FIG. 2) such that state machine 64 has little or no influence upon the $DAC_{[4-0]}$ control signal. During task 86, the I and Q signal components are filtered through filters 20 and 22, respectively. After task 86, query task 84 is reentered to again test for symbol and node synchronization.

If query task 84 determines that receiver 10 is synchronized, then a task 88 is performed. Task 88 causes the bandwidth of filters 20 and 22 to be tuned in a fine manner. For example, task 88 may cause switches 72 and 74 to allow DAC control circuit 52 to periodically update the current $DAC_{[4-0]}$ control signal in response to changes in the BER over time. Thus, the FTUNE signal becomes influenced by changes in both the IFREQ signal and the $DAC_{[4-0]}$ word.

Following task 88, a task 90 writes the current $DAC_{[4-0]}$ control signal into control register 70 to update the historical tuning data. As indicated by the ellipses in FIG. 3, task 90 may be performed periodically after several fine tuning iterations of task 88.

Following task 90 (or between iterations of task 88), tuning process 78 is reentered at query task 80. Thus, receiver 10 improves the signal quality of the decoded data by utilizing the feedback-controlled tunable analog filtering circuit. If receiver 10 retains symbol and node synchronization with the input signal, then the bandwidth of filters 20 and 22 is closely regulated. The fine tuning capability of receiver 10 is controlled by state machine 64 (see FIG. 2).

Figure 4:
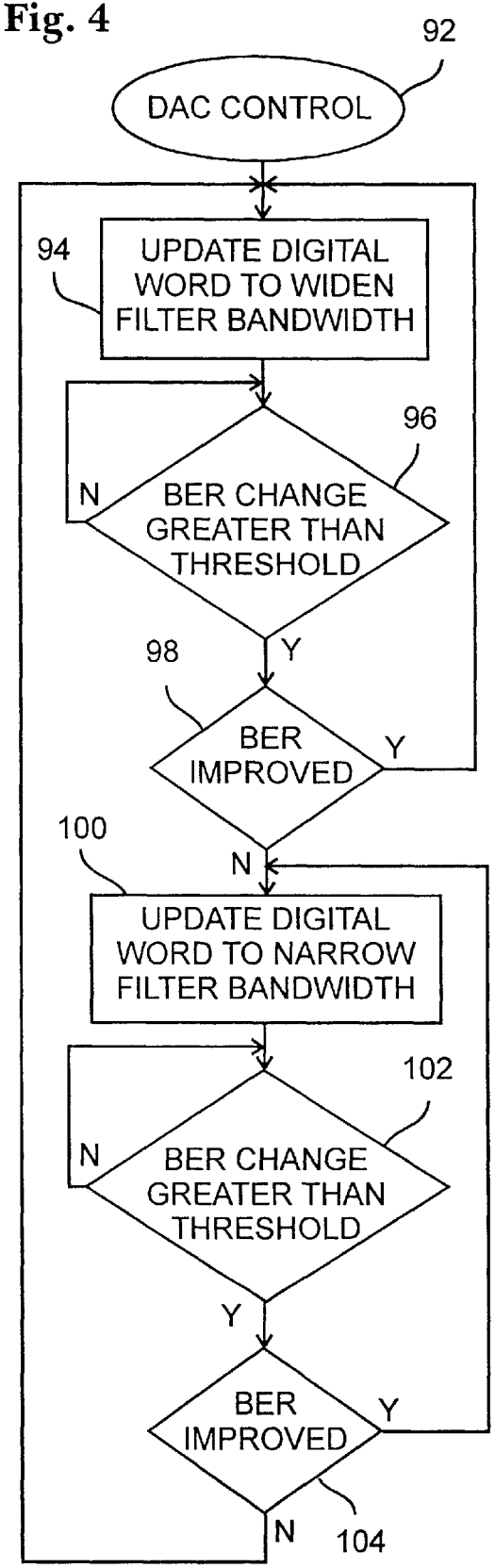
FIG. 4 is a flow diagram of a DAC control process performed by a DAC control circuit.
Figure 5:
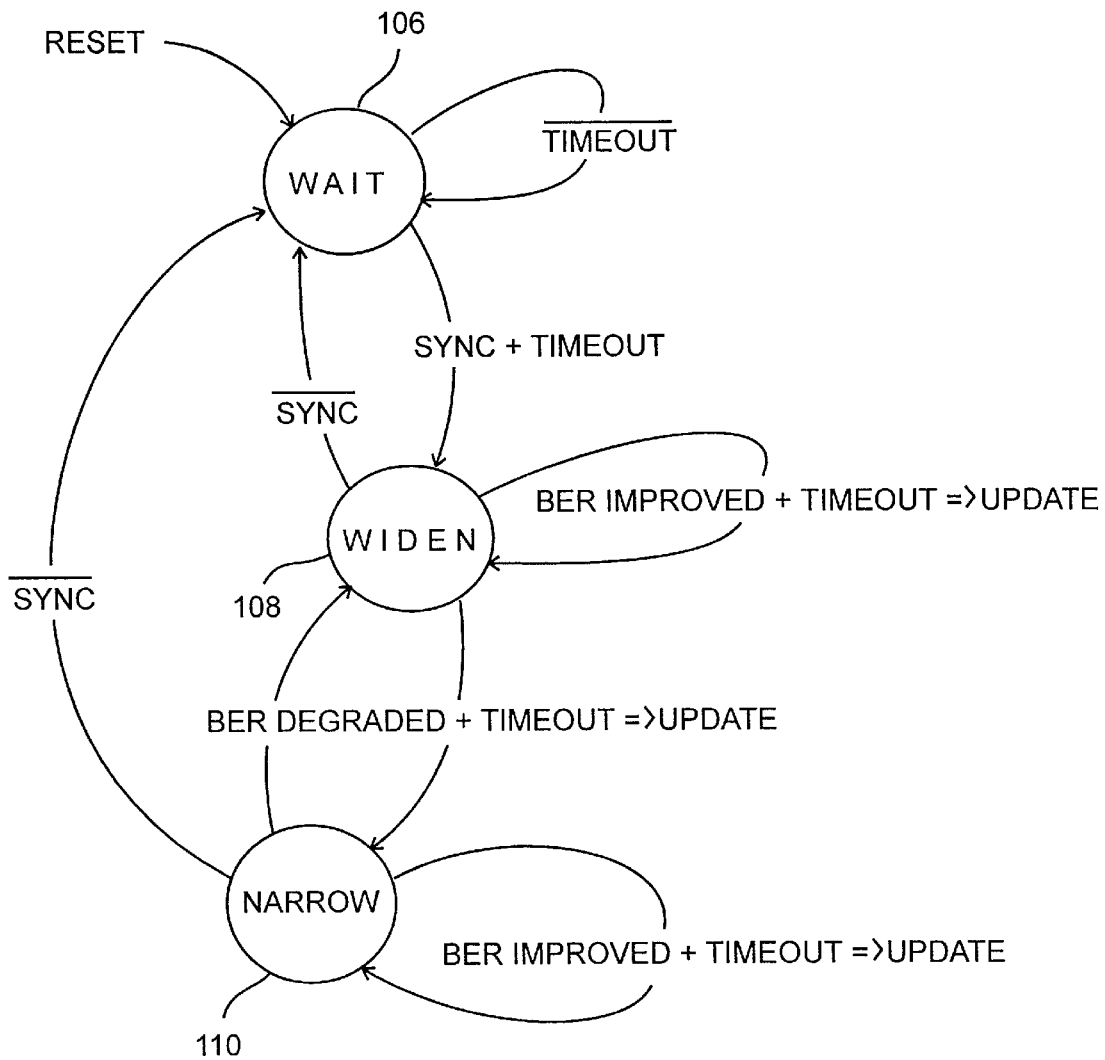
FIG. 5 is a state diagram depicting the operation of the DAC control circuit.

FIG. 4 is a flow diagram of a DAC control process 92 performed by receiver 10, and FIG. 5 is a state diagram depicting the operation of state machine 64. Process 92 determines whether to increment, decrement, or maintain the value of the digital word stored in update register 68 (see FIG. 2). Process 92 begins at initial power-up of receiver 10, and preferably restarts if receiver 10 loses symbol or node synchronization or if an internal reset request is detected. For example, if state machine 64 hangs up or if digital circuit 28 detects an operational error, then a reset request may be generated.

State machine 64 initially enters a WAIT state 106 during which receiver 10 attempts to acquire symbol synchronization. While receiver 10 is in WAIT state 106, the analog phase locked loop (described above) operates to achieve symbol synchronization. In addition, receiver 10 may remain in WAIT state 106 until a timeout signal is indicated. As described above, receiver 10 preferably generates a timeout signal once every $2^{19}$ symbols. At the first timeout after receiver 10 acquires symbol synchronization, a WIDEN state 108 is entered.

While receiver 10 is in WIDEN state 108, DAC control process 92 begins with a task 94, which updates the digital word stored in update register 68 to adjust the bandwidth of filters 20 and 22. In the preferred embodiment, receiver 10 initially widens the bandwidth to ensure that symbol synchronization is not lost (which may occur if the bandwidth is initially narrowed). Task 94 may widen the bandwidth by any increment selected according to the desired tuning resolution of filters 20 and 22. The value of the digital word stored in update register 68 may be incremented (or decremented) to widen the filter bandwidth.

Following task 94, a query task 96 determines whether the difference between a past BER estimation and the current BER estimation is greater than a predetermined threshold. Query task 96 is preferably performed by BER comparator 66 (see FIG. 2). The threshold may be selected such that receiver 10 ignores slight variations in the BER that may be tolerated without adversely affecting the performance of receiver 10. In the preferred embodiment, the threshold value is selected such that changes of approximately 12% or less are tolerated.

If query task 96 determines that the change in the BER is not above the threshold value, then task 96 is reentered and repeated after the next timeout has elapsed. In other words, state machine 64 idles in WIDEN state 108 but takes no action until a significant BER change is detected. If query task 96 finds that the change in the BER exceeds the threshold value, then a query task 98 is prompted.

Query task 98 tests whether the BER improved in response to the widening of the filter bandwidth. If query task 98 determines that the BER improved, then task 94 is reentered to further widen the filter bandwidth. Subsequent alterations in the filter bandwidth may be delayed until a timeout is indicated. In addition, the new BER estimation may be stored in BER comparator 66 for subsequent comparisons. This portion of DAC control process 92 is represented in FIG. 5 by the update loop that reenters WIDEN state 108. If query task 98 determines that the BER degraded, then a task 100 is performed after state machine 64 enters a NARROW state 110.

Task 100 updates the digital word stored in update register 68 to narrow the filter bandwidth by a predetermined increment. For example, task 100 may decrement (or increment) the value of the digital word stored in update register 68. After waiting for a timeout interval, a query task 102 is prompted to determine whether the difference between the BER estimation stored in BER comparator 66 and the current BER estimation exceeds the threshold. If the change is less than the threshold value, then query task 102 is repeated after a timeout period and state machine 64 remains idle in NARROW state 110.

If query task 102 finds that the change in the BER estimation exceeds the threshold amount, then a query task 104 begins. Query task 104 tests whether the BER improved in response to the narrowing of the filter bandwidth. If the BER improved, then task 100 is repeated after the expiration of a timeout interval. In other words, state machine 64 reenters NARROW state 110 to further narrow the filter bandwidth.

If, however, query task 104 finds that the BER degraded, then DAC control process 92 is reentered at task 94, which widens the filter bandwidth after waiting for a timeout period. As described above and shown in FIG. 5, state machine 64 reenters WAIT state 106 and process 92 restarts at task 94 if receiver 10 loses symbol or node synchronization or if a reset request is detected.

Thus, process 92 periodically monitors the change in BER of the decoded digital data over time and adjusts the current bandwidth of filters 20 and 22 according to realtime changes in the BER. Receiver 10 fine tunes the filter bandwidth to optimize the BER, which minimizes the degradation due to ISI, ACI, and AWGN in the sampled input signal.

In summary, the present invention provides an improved digital data receiver that includes a tunable analog filtering circuit. The bandwidth of the analog filtering circuit is responsive to the BER of the decoded data. The feedback-controlled analog filtering circuit allows the digital data receiver to be realized with inexpensive components having broad electronic tolerances. In addition, the receiver is capable of operating over a wide range of input baud rates.

The above description is of a preferred embodiment of the present invention, and the invention is not limited to the specific embodiment described and illustrated. For example, the various circuits have been simplified for the sake of clarity, and in practice they may include additional components or perform conventional operations not described herein. In addition, the operating frequencies, the digital data configurations, the frequency divisors, and other specified parameters are used herein for illustrative purposes and are not intended to limit the scope of the present invention. Furthermore, many variations and modifications will be evident to those skilled in this art, and such variations and modifications are intended to be included within the spirit and scope of the invention, as expressed in the following claims.

What is claimed is:

1. A method for processing a received data communication signal, said method comprising the steps of:

filtering an analog signal derived from an RF data communication signal and configured to convey digital data, said filtering step being performed by an analog filtering circuit;

decoding said digital data;

comparing a present signal quality indicator obtained from said decoded digital data to a past signal quality indicator obtained from said decoded digital data; and tuning said analog filtering circuit in response to said comparing step.

2. A method according to claim 1, wherein said present and past signal quality indicators are responsive to present and past bit error rates, respectively.

3. A method according to claim 1, wherein said analog filtering circuit has a variable bandwidth and said tuning step comprises the steps of:

combining a coarse control signal with a fine control signal to generate a tuning control signal; and adjusting said bandwidth of said analog filtering circuit in response to said tuning control signal.

4. A method according to claim 3, wherein said analog signal conveys said digital data at a baud rate and said method further comprises the step of converting a reference frequency into said coarse control signal such that said coarse control signal is responsive to said baud rate.

5. A method according to claim 3, further comprising the steps of:

obtaining a digital word associated with an update request;

converting said digital word into an analog equivalent; and performing an arithmetic operation upon said analog equivalent and said coarse control signal to generate said fine control signal.

6. A method according to claim 1, further comprising the steps of:

pre-tuning said analog filtering circuit according to historical tuning data; and synchronizing a symbol timing generator to said analog signal, said synchronizing step occurring after said pre-tuning step.

7. A method according to claim 1, wherein said analog filtering circuit has a variable bandwidth and said tuning step comprises the steps of:

adjusting said bandwidth of said analog filtering circuit; and altering said bandwidth when signal quality changes in response to said adjusting step.

8. A method according to claim 7, wherein:

said adjusting step widens said bandwidth;

said altering step widens said bandwidth when signal quality improves in response to said adjusting step; and said altering step narrows said bandwidth when signal quality worsens in response to said adjusting step.

9. A method according to claim 7, wherein:

said adjusting step narrows said bandwidth;

said altering step narrows said bandwidth when signal quality improves in response to said adjusting step; and said altering step widens said bandwidth when signal quality worsens in response to said adjusting step.

10. A method according to claim 7, wherein said adjusting and said altering steps are performed after a symbol timing generator is synchronized to said analog signal.

11. A method according to claim 7, wherein said altering step is not performed unless signal quality changes by at least a predetermined amount in response to said adjusting step.

12. A method for processing a received data communication signal, said method comprising the steps of:

filtering an analog signal configured to convey digital data at a baud rate, said filtering step being performed by an analog filtering circuit having a variable bandwidth;

generating a coarse control signal in response to said baud rate;

tuning said analog filtering circuit with a tuning control signal that incorporates said coarse control signal by combining said coarse control signal with a fine control signal to generate said tuning control signal, and adjusting said bandwidth of said analog filtering circuit in response to said tuning control signal;

obtaining a digital word associated with an update request;

converting said digital word into an analog equivalent; and performing an arithmetic operation upon said analog equivalent and said coarse control signal to generate said fine control signal.

13. A method according to claim 12, wherein said generating step converts a reference frequency into said coarse control signal.

14. A method according to claim 12, wherein said analog filtering circuit has a variable bandwidth and said tuning step comprises the steps of:

adjusting said bandwidth of said analog filtering circuit; and altering said bandwidth when signal quality changes in response to said adjusting step.

15. A method according to claim 14, wherein said altering step is not performed unless signal quality changes by at least a predetermined amount in response to said adjusting step.

16. A method for processing a received data communication signal, said method comprising the steps of:

filtering an analog signal configured to convey digital data at a baud rate, said filtering step being performed by an analog filtering circuit;

generating a coarse control signal in response to said baud rate;

tuning said analog filtering circuit with a tuning control signal that incorporates said coarse control signal;

comparing a present signal quality indicator to a past signal quality indicator;

generating a fine control signal in response to said comparing step; and combining said coarse control signal with said fine control signal to generate said tuning control signal.

17. A method according to claim 16, wherein said present and past signal quality indicators are responsive to present and past bit error rates, respectively.

18. A data communications receiver for processing an analog signal configured to convey digital data, said receiver comprising:

an analog filtering circuit configured to filter said analog signal, said filtering circuit having a variable bandwidth responsive to a current tuning control signal;

means, coupled to said filtering circuit, for obtaining a signal quality indicator; and means for generating said current tuning control signal, said current tuning control signal being responsive to changes occurring in said signal quality indicator over time, and said means for generating being coupled to said means for obtaining a signal quality indicator.

19. A receiver according to claim 18, wherein said analog signal includes an I component and a Q component, and said analog filtering circuit comprises a first matched filter associated with said I component and a second matched filter associated with said Q component.

20. A receiver according to claim 18, wherein said current tuning control signal incorporates a coarse control signal and said receiver further comprises a frequency converter configured to convert a reference frequency into said coarse control signal.

21. A receiver according to claim 18, further comprising a comparator coupled to said means for obtaining a signal quality indicator, wherein said comparator is configured to calculate a difference between a present signal quality indicator and a past signal quality indicator, and said current tuning control signal incorporates a fine control signal generated in response to said difference.

* * * * *

UNITED STATES PATENT AND TRADEMARK OFFICE
CERTIFICATE OF CORRECTION

PATENT NO.   : 5,949,832

DATED        : September 7, 1999

INVENTOR(S)  : John Michael Liebetreu, Eric Martin Brombaugh and Wyn T. Palmer

It is certified that error appears in the above-identified patent and that said Letters Patent is hereby corrected as shown below:

On the title page: Item [73] Assignee:" add the following:

Analog Devices, Inc., Norwood, Massachusetts

Signed and Sealed this

Ninth Day of January, 2001

Attest:

Q. TODD DICKINSON

*Attesting Officer*           *Commissioner of Patents and Trademarks*